United States Patent
Mastro et al.

(10) Patent No.: US 10,072,521 B2
(45) Date of Patent: Sep. 11, 2018

(54) FDGS AUXILIARY PUMP MONITORING SYSTEM

(71) Applicant: United Technologies Corporation, Farmington, CT (US)

(72) Inventors: Jacob P. Mastro, Glastonbury, CT (US); Francis Parnin, Suffield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 80 days.

(21) Appl. No.: 15/101,714

(22) PCT Filed: Dec. 2, 2014

(86) PCT No.: PCT/US2014/068227
§ 371 (c)(1),
(2) Date: Jun. 3, 2016

(87) PCT Pub. No.: WO2015/126500
PCT Pub. Date: Aug. 27, 2015

(65) Prior Publication Data
US 2016/0305284 A1    Oct. 20, 2016

Related U.S. Application Data

(60) Provisional application No. 61/912,264, filed on Dec. 5, 2013.

(51) Int. Cl.
*F01D 25/20* (2006.01)
*F01M 1/20* (2006.01)
(Continued)

(52) U.S. Cl.
CPC ............... *F01D 25/20* (2013.01); *F01M 1/20* (2013.01); *F01M 11/0004* (2013.01);
(Continued)

(58) Field of Classification Search
CPC .......... F01D 25/30; F01D 15/12; F01D 17/08; F01M 1/20; F01M 11/0004;
(Continued)

(56) References Cited

U.S. PATENT DOCUMENTS

| 3,976,165 A | 8/1976 | Pilarczyk | |
| 5,121,598 A * | 6/1992 | Butler | F02C 7/14 |
| | | | 60/39.08 |

(Continued)

FOREIGN PATENT DOCUMENTS

| EP | 2253805 A2 | 11/2010 |
| EP | 3044438 A2 | 7/2016 |
| GB | 690120 A | 4/1953 |

OTHER PUBLICATIONS

English Abstract for GB690120A—Apr. 15, 1953.
(Continued)

*Primary Examiner* — Michael A Riegelman
(74) *Attorney, Agent, or Firm* — Cantor Colburn LLP

(57) ABSTRACT

A lubrication system for an engine including a scavenge pump configured to provide lubricant to the engine during a normal condition, an auxiliary pump configured to provide lubricant to the engine during an abnormal condition, a pressure sensor disposed at an outlet of the auxiliary pump for detecting a pressure created by the auxiliary pump, and a restriction device disposed in a conduit fluidly connecting the scavenge pump to the outlet of the auxiliary pump and configured to increase a first pressure produced by the auxiliary pump at the pressure sensor, wherein the first pressure is greater than a second pressure created by the scavenge pump at the pressure sensor.

18 Claims, 3 Drawing Sheets

(51) Int. Cl.
*F01M 11/00* (2006.01)
*F01M 1/12* (2006.01)
*F01D 15/12* (2006.01)
*F01D 17/08* (2006.01)

(52) U.S. Cl.
CPC .............. *F01D 15/12* (2013.01); *F01D 17/08* (2013.01); *F01M 2001/123* (2013.01); *F01M 2011/0095* (2013.01); *F05D 2220/32* (2013.01); *F05D 2260/40311* (2013.01); *F05D 2260/80* (2013.01); *F05D 2260/98* (2013.01); *F05D 2270/301* (2013.01); *F05D 2270/3013* (2013.01); *F16N 2260/00* (2013.01)

(58) Field of Classification Search
CPC ...... F01M 2001/123; F01M 2011/0095; F05D 2220/32; F05D 2260/40311; F05D 2260/80; F05D 2260/98; F05D 2270/301; F05D 2270/3013; F16N 2260/00
See application file for complete search history.

(56) References Cited

U.S. PATENT DOCUMENTS

| | | | | |
|---|---|---|---|---|
| 5,318,151 A * | 6/1994 | Hood | ................... | F04C 29/021 184/104.1 |
| 6,481,978 B2 * | 11/2002 | Zamalis | ................. | F01D 21/00 184/6.11 |
| 7,506,724 B2 * | 3/2009 | Delaloye | ................. | F01D 25/18 137/38 |
| 9,410,448 B2 * | 8/2016 | Sheridan | ................ | F01D 25/20 |
| 9,644,506 B2 * | 5/2017 | Bidner | ..................... | F01M 1/02 |
| 2003/0230274 A1 * | 12/2003 | Williams | ................. | F01M 1/02 123/196 R |
| 2010/0294597 A1 * | 11/2010 | Parnin | ..................... | F01D 25/18 184/6.1 |
| 2011/0108360 A1 | 5/2011 | Dibenedetto | | |
| 2011/0297485 A1 | 12/2011 | Sheridan et al. | | |
| 2012/0241258 A1 * | 9/2012 | Subramaniam | ........... | F16N 7/40 184/6.4 |
| 2014/0150439 A1 * | 6/2014 | Parnin | ...................... | F02C 7/06 60/772 |
| 2016/0215652 A1 * | 7/2016 | Mastro | ..................... | F01D 25/20 |
| 2016/0245117 A1 * | 8/2016 | Parnin | ..................... | F01D 25/20 |
| 2017/0114662 A1 * | 4/2017 | Mastro | ..................... | F01D 25/20 |
| 2017/0114784 A1 * | 4/2017 | Parnin | ..................... | F01D 25/20 |

OTHER PUBLICATIONS

International Search Report for International Application No: PCT/US14/68227; International Filing date: Dec. 2, 2014; dated Dec. 30, 2015; 2 pgs.

Written Opinion for International Application No. PCT/US14/68227; International Filing Date: Dec. 2, 2014; dated Jul. 30, 2015; 6 pgs.

European Search Report issued in EP Application No. 14883355.1, dated Aug. 21, 2017, 8 Pages.

* cited by examiner

FDGS AUXILIARY PUMP MONITORING SYSTEM

CROSS-REFERENCE TO RELATED APPLICATIONS

This application claims priority to U.S. Provisional Application No. 61/912,264 filed on 5 Dec. 2013 and titled FDGS Auxiliary Pump Monitoring System, the disclosure of which is hereby incorporated by reference in its entirety.

BACKGROUND

The present disclosure relates generally to a lubrication system for engines, and, more particularly, to a monitoring system for an auxiliary pump in the lubrication system.

Aircraft turbine engines include various components that require lubrication to maintain their functionality. During normal operation, a main oil system normally provides lubricant to these components. However, for engines utilizing a Fan Drive Gear System (FDGS), it is desirable to include an emergency system so that in conditions where the main oil system fails or operates abnormally, the FDGS will not be detrimentally affected by a loss of oil pressure from the main oil system. Some examples in which the main oil system may not provide adequate oil to the FDGS include reduced or negative gravity (G) operating conditions.

Conventional lubricant system in FDGS has an emergency subsystem to back up the main system. However the safe operation of the emergency subsystem itself is not monitored in the conventional lubricant system. It is also imperative that any failure of the emergency system, particularly an auxiliary pump employed therein, be detected by an operator of the engine because of the need of the FDGS to be supplied with lubricant during operation.

As such, what is desired is an emergency system monitoring mechanism that can correctly detects a failure of the emergency system without impairing the entire lubricant system's performance.

SUMMARY

A lubrication system for an engine is disclosed which comprises a scavenge pump configured to provide lubricant to the engine during a normal condition, an auxiliary pump configured to provide lubricant to the engine during an abnormal condition, a pressure sensor disposed at an outlet of the auxiliary pump for detecting a pressure created by the auxiliary pump, and a restriction device disposed in a conduit fluidly connecting the scavenge pump to the outlet of the auxiliary pump and configured to increase a first pressure produced by the auxiliary pump at the pressure sensor, wherein the first pressure is greater than a second pressure created by the scavenge pump at the pressure sensor.

The construction and method of operation of the present disclosure, however, together with additional objectives and advantages thereof will be best understood from the following description of specific embodiments when read in connection with the accompanying drawings.

BRIEF DESCRIPTION OF THE DRAWINGS

The drawings accompanying and forming part of this specification are included to depict certain aspects of the present disclosure. A clearer conception of the present disclosure, and of the components and operation of systems provided with the present disclosure, will become more readily apparent by referring to the exemplary, and therefore non-limiting, embodiments illustrated in the drawings, wherein like reference numbers (if they occur in more than one view) designate the same elements. The present disclosure may be better understood by reference to one or more of these drawings in combination with the description presented herein. It should be noted that the features illustrated in the drawings are not necessarily drawn to scale.

DESCRIPTION

An emergency system monitoring mechanism is used to monitor the emergency pump system of an engine lubricant system. An embodiment of the present disclosure will be described hereinafter with reference to the attached drawings.

Figure 1:
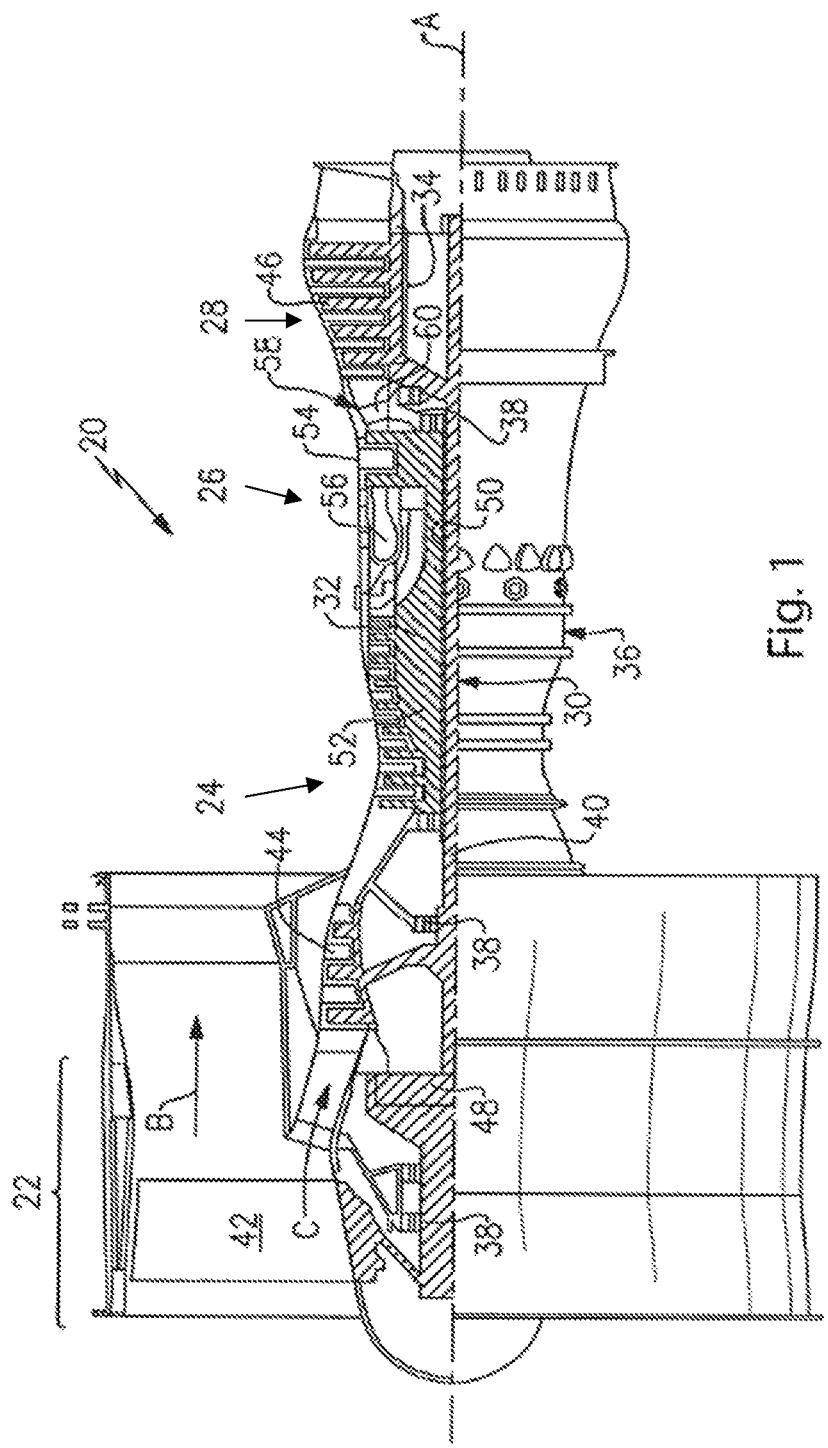
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7 ° R)]0.5. The "Low corrected fan tip speed" as disclosed herein according to one non-limiting embodiment is less than about 1150 ft/second.

Figure 2:
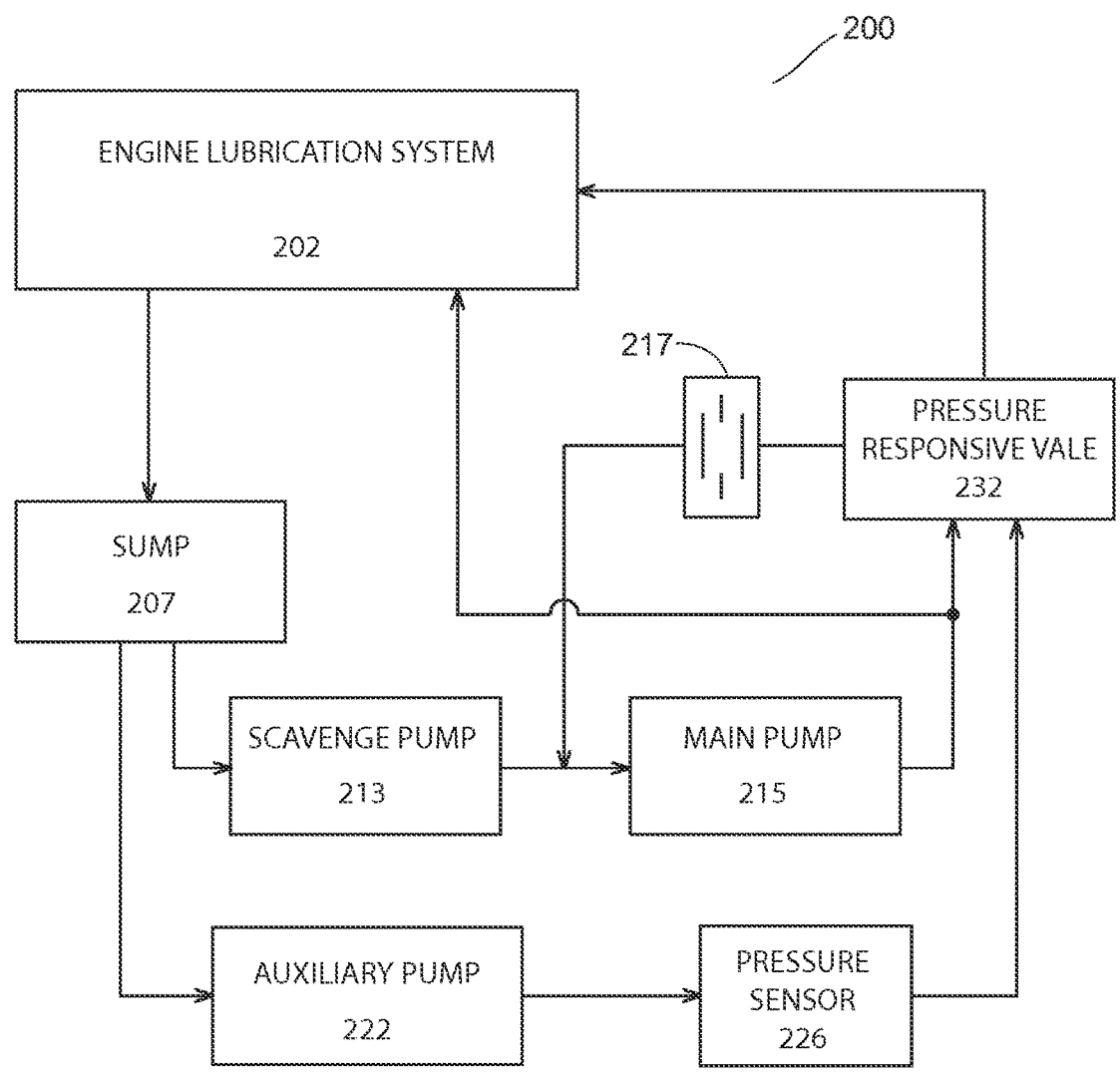
FIG. 2 is a block diagram illustrating a lubrication system having an auxiliary pump monitoring system according to an embodiment.

FIG. 2 is a block diagram illustrating a lubrication system 200 having an auxiliary pump monitoring system according to an embodiment. The lubrication system 200 is part of an engine system and supplies lubricant to an engine lubrication system 202. Other components of the lubrication system 200 include a sump 207, a scavenge pump 213, a main pump 215, a restriction device 217, an auxiliary pump 222, a pressure sensor 226 and a pressure responsive valve 232. The sump 207 collects lubricant returned from the engine lubrication system 202. The scavenge pump 213 extracts lubricant from the sump 207 and supplies the extracted lubricant to the main pump 215. The main pump 215 supplies lubricant to the engine lubrication system 202 both directly and through the pressure responsive valve 232 to different parts of the engine lubrication system 202 (more details are forthcoming in FIG. 3 and the associated description). The pressure responsive valve 232, responding to normal pressure in the lubrication system 200, directs lubricant received from the main pump 215 to the engine lubrication system 202 and directs reserve lubricant received from the auxiliary pump 222 to the main pump 215 through the restriction device 217.

During an emergency situation, i.e., the main pump 215 fails to work properly, the auxiliary pump 222 extract lubricant from the sump 207 and supplies the lubricant to the engine lubrication system 202 through the pressure responsive valve 232. The pressure sensor 226 is position at an output of the auxiliary pump 222 to monitor a pressure at an outlet of the auxiliary pump 222. In order for the pressure sensor 226 to sense only a pressure created by the auxiliary pump 222, the restriction device 217 is employed to prevent the scavenge pump 213 from pressurizing the outlet of the auxiliary pump 222. In one embodiment, the lubrication system 200 may be employed with a Fan Drive Gear System (FDGS).

Figure 3:
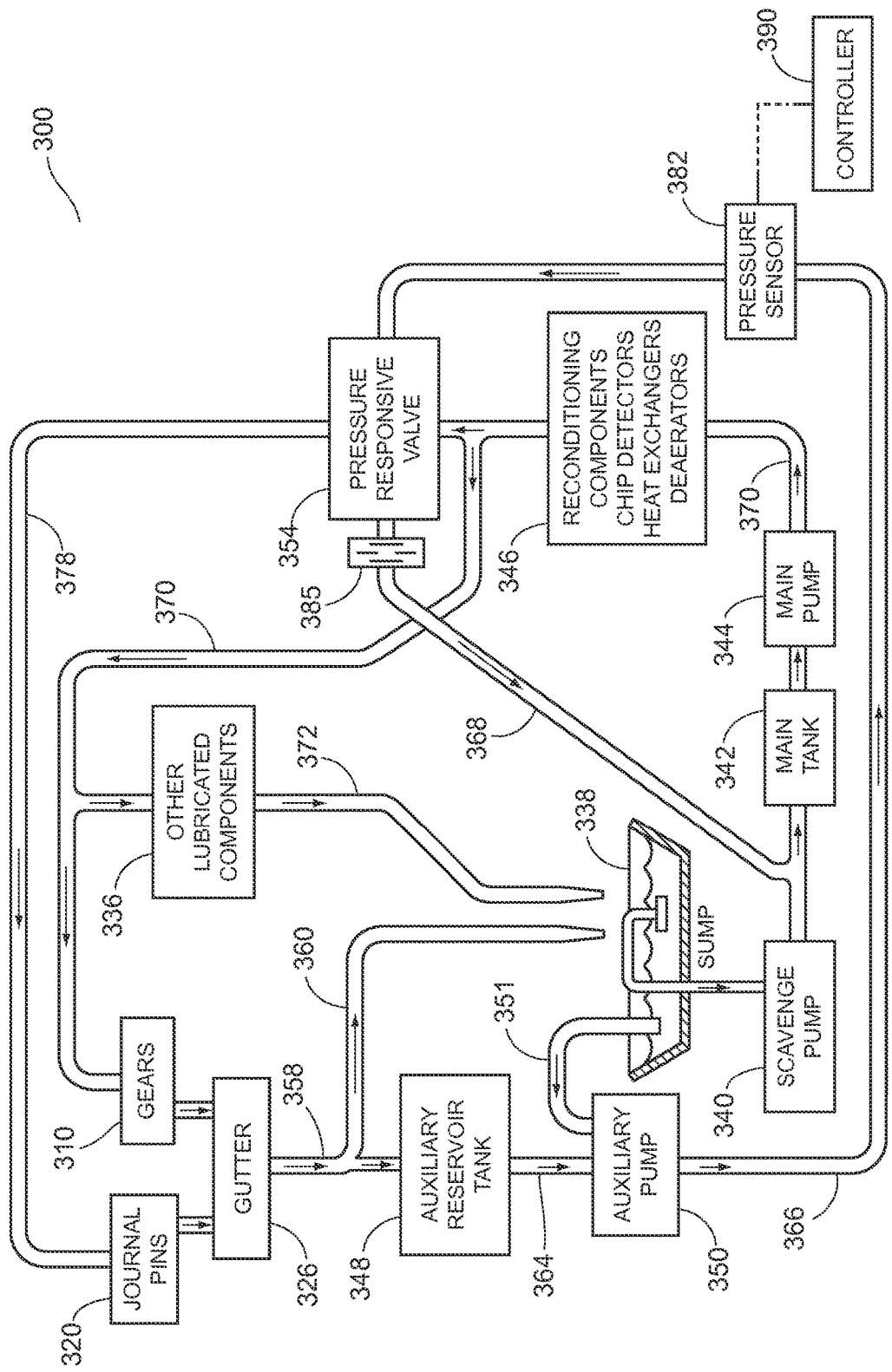
FIG. 3 is a schematic diagram illustrating a lubrication system having an auxiliary pump monitoring system according an embodiment.

FIG. 3 is a schematic diagram illustrating a lubrication system 300 having a monitored emergency system according to an embodiment. The lubrication system 300 includes a sump 338, a scavenge pump 340 for scavenging lubricant from the sump 338, a main tank 342 for receiving lubricant from the scavenge pump 340, a main pump 344 for pumping lubricant from the main tank 342, and various lubricant reconditioning components such as chip detectors, heat exchangers and deaerators, collectively designated 346. The lubrication system 300 also includes an auxiliary system which includes an auxiliary lubricant reservoir or tank 348 and an auxiliary pump 350. In addition, the lubrication system 300 includes a pressure responsive valve 354.

In an embodiment, an auxiliary tank supply conduit 358 extends from the gutter 26 to the auxiliary tank 48. The gutter 26 catches lubricant exited out lubricated parts and serves as a source of lubricant for the auxiliary tank 348. A main bypass line 360 branches from the supply conduct 358 and extends to the sump 338. An auxiliary tank discharge conduit 364 extends from the auxiliary tank 348 to the auxiliary pump 350. An auxiliary pump discharge line 366 extends from the auxiliary pump 350 to the pressure responsive valve 354. A main tank return line 368 extends from the pressure responsive valve 354 to the main lubricant tank 342. A lubricant delivery pathway 370 extends from the main pump 344 through the various lubricant reconditioning components 346 and ultimately to the gears 310 and the other components 336. A lubricant return pathway 372 extends from the other components 336 to the sump 338. A portion of the delivery pathway 370 leads to the pressure responsive valve 354. A journal pin delivery line 378 extends from the pressure responsive valve 354 to the journal pins 320. The pressure responsive valve 354 is dynamic and switches lubricant source from the main pump 344 to the auxiliary pump 350 when an oil pressure at the main pump 344 drops below a predetermined minimum value.

During normal operation, rotation of the gears expels lubricant radially outwardly, and with a high tangential velocity into the lubricant recovery gutter 326. A large portion of the lubricant flows through the main bypass line 360 and returns to the sump 338. A smaller portion of the lubricant flows into the auxiliary tank 348 to establish or replenish a reserve quantity of lubricant therein. The auxiliary pump 350 pumps lubricant from the auxiliary tank 348 to the pressure responsive valve 354. Concurrently, the scavenge pump 340 extracts lubricant from the sump 338 and delivers it to the main tank 342. The main pump 344 pumps the lubricant from the main tank 342 to the reconditioning components 346. Most of the reconditioned lubricant then flows to the gears 310 and the other components 336. The remainder of the lubricant flows to the pressure responsive valve 354, which responding to normal pressure in the lubrication system, directs this remaining lubricant to the journal pins 320 and directs reserve lubricant received from the auxiliary pump 350 to the main tank 342.

During an abnormal operation (e.g. due to a severe leak, clog or malfunction of a system component) the lubricant pressure drops such that an unsatisfactorily reduced quantity of lubricant flows through the lubricant delivery pathway 370. In response to the abnormally low pressure, the pressure responsive valve 354 shunts the reserve lubricant received from the auxiliary pump 350 to the journal pins 320 to ensure that the pins receive lubricant, at least temporarily. The gear system at first continues to expel a large quantity of lubricant into the gutter 326. As with normal operation, a large portion of the lubricant flows through the main bypass line 360 and returns to the sump 338. A smaller portion of the lubricant flows to the auxiliary tank 348 to at least partially replenish the lubricant being withdrawn by the auxiliary pump 350. If the abnormally low lubricant pressure persists, the lubricant system 300 will reach a state where the quantity of lubricant circulating through the system is small enough that little or no lubricant backs up from the auxiliary tank 48 and enters the main bypass line 360. Instead, nearly all of the limited quantity of lubricant flows to the auxiliary pump 350 and eventually back to the journal pins 320. This state of operation persists until the auxiliary tank 348 is depleted and the flow rate from the gutter 326 is insufficient to replenish it.

Referring again to FIG. 3, the auxiliary pump 350 employs a monitoring system according an embodiment. The auxiliary pump monitoring system includes a pressure sensor 382 and a restriction device 385. The pressure sensor 382 is disposed along the auxiliary pump discharge line 366 for detecting lubricant pressure at the outlet side of the auxiliary pump 350. The pressure sensor 382 is in communication with a controller 390, which may be implemented, for example, by a Full Authority Digital Electronic Control (FADEC) or an Electronic Centralized Aircraft Monitor (ECAM) (both are not shown) in the engine shown in FIG. 1. The restriction device 385 is disposed in a main tank return line 368 from the pressure responsive valve 354 to the main tank 342 may be exemplarily implemented with an orifice. Because the restriction device 385 is not disposed in the emergency circuit comprising the auxiliary pump discharge line 366 through the pressure responsive valve 354 to the journal pin delivery line 378 to the journal pins 320, the restriction device 385 will not detrimentally affect the performance of the emergency system under the reduced or negative G condition.

In an embodiment, during engine operation, when the pressure sensor 382 detects a pressure above a predetermined value, the auxiliary pump 350 is functioning properly. On the other hand, if a detected pressure is equal to or below the predetermined value, the pressure sensor 382 will send a failed pump indication signal to the controller 390. Specifically, if the auxiliary pump 350 is functioning, there will be oil flowing through the line 366 and creating a pressure. If the auxiliary pump 350 has failed, the pressure at the line 366 will be zero or a static value that is dependent on the pressure in the sump 338. There are cases where the auxiliary pump 350 may fail in a manner where there could be a negative pressure at pressure sensor 382 due to a negative pressure in the sump 338 created by a properly functioning scavenge pump 340.

The pressure sensor 382 can be programmed to work in two ways. One is if the pressure never increases beyond a predetermined value, then a failure of the auxiliary pump 350 is detected, because it creates no pressure. The other way is to measure two distinct points in the engine operating envelop a low speed (low pressure) as well as a high speed (high pressure), if the delta between these two points is greater than a predetermined value, then the auxiliary pump 350 is detected to be working properly; otherwise, the auxiliary pump 350 is not working to a desired standard. Apparently, the second option is a more finite answer to how well the auxiliary pump 350 is working than the first option which only detects if the auxiliary pump 350 is working or not.

In an embodiment, the failure indication is relayed the signal to ground maintenance crews for investigation into the failed pump indication. As a result, the present disclosure allows for an early detection of a failure of the emergency system. Without such early detection, a conventional lubricant system will have to rely on monitoring the engine for metallic chips appearing in the chip detectors 346 to detect a failure. Furthermore the conventional lubricant system can only alert that there must be something wrong upon the presence of the metallic chips, and cannot identify that it is the auxiliary pump 350 that is not working.

Referring again to FIG. 3, in case of an emergency, the pressure responsive valve 354 is in fluid communication with the auxiliary pump discharge line 366 to components such as the scavenge pump 340. Without the restriction device 385, the scavenge pump 340 can pressurize the auxiliary pump discharge line 366 regardless if the auxiliary pump 350 is working or not. If a pressure sensor is introduced to this environment, i.e., without the restriction device 385, it will detect pressure that is coming from the scavenge pump 340 even when the auxiliary pump 350 has failed, therefore allowing for a false reading. To eliminate the possibility of this false reading, the restriction device 385 is introduced in the main tank return line 368. The restriction device 385 restrict the flow of lubricant from the auxiliary pump 350 to the scavenge pump 340. This restriction of flow will amplify a delta in pump pressures that are created by the auxiliary pump 350 at a low speed (low pressure) and at a high speed (high pressure). This amplified higher pressure will be greater than any pressure that may be created by the scavenge pump 340, so that the pressure at the auxiliary pump discharge line 366 that is detected by the pressure sensor 382 will not be affected by the scavenge pump 340.

Referring again to FIG. 3, there is an auxiliary pump input line 351 connecting the sump 338 to an inlet of the auxiliary pump 350. In case of an emergency, the auxiliary pump 350 can extract lubricant from the sump 338 in addition to the auxiliary tank 348, so that the emergency system will never run out of lubricant.

It should be realized that the above description and the schematic illustrations are highly simplified in comparison to an actual lubrication system. For example, an actual system may have multiple lubricant conduits, lines, pathways, pumps, etc., corresponding to each of the components discussed above and illustrated.

The above illustration provides many different embodiments or embodiments for implementing different features of the present disclosure. Specific embodiments of components and processes are described to help clarify the present disclosure. These are, of course, merely embodiments and are not intended to limit the present disclosure from that described in the claims.

Although the present disclosure is illustrated and described herein as embodied in one or more specific examples, it is nevertheless not intended to be limited to the details shown, since various modifications and structural changes may be made therein without departing from the spirit of the present disclosure and within the scope and range of equivalents of the claims. Accordingly, it is appropriate that the appended claims be construed broadly and in a manner consistent with the scope of the present disclosure, as set forth in the following claims.

The invention claimed is:

1. A lubrication system for an engine, the lubrication system comprising:
   a first pump configured to provide lubricant to the engine during a normal condition;
   a second pump configured to provide lubricant to the engine during an abnormal condition;
   a pressure sensor disposed at an outlet of the second pump and configured to detect a pressure created by the second pump;
   a restriction device disposed in a conduit fluidly connecting the first pump to the outlet of the second pump and configured to increase a first pressure produced by the second pump at the pressure sensor, wherein the first pressure is greater than a second pressure created by the first pump at the pressure sensor; and
   a pressure responsive valve disposed in a common delivery pathway of both the first pump and the second pump, the pressure responsive valve shunting the lubricant received from the second pump to the engine during the abnormal condition;
   wherein the pressure sensor is disposed along a fluid pathway connecting the second pump to the pressure responsive valve, between the second pump and the pressure responsive valve; and
   wherein the restriction device is disposed along the conduit between the first pump and the pressure responsive valve.

2. The lubrication system of claim 1, wherein the first pump is a scavenge pump for extracting lubricant from a sump, the sump collecting lubricant from the engine.

3. The lubrication system of claim 2, further comprising a conduit fluidly connecting the sump to an inlet of the second pump.

4. The lubrication system of claim 1, wherein the second pump is an auxiliary pump.

5. The lubrication system of claim 1, wherein the pressure sensor sends a failed pump indication to a controller when the pressure sensor detects a pressure below a predetermined value.

6. The lubrication system of claim 1, wherein the restriction device is an orifice.

7. The lubrication system of claim 1, further comprising an auxiliary tank collecting lubricant from the engine and supplying the lubricant to the second pump.

8. A lubrication system for an engine, the lubrication system comprising:
   a scavenge pump configured to provide lubricant to the engine during a normal condition;
   an auxiliary pump configured to provide lubricant to the engine during an abnormal condition;
   a pressure sensor disposed at an outlet of the auxiliary pump for detecting a pressure created by the auxiliary pump;
   a restriction device disposed in a conduit fluidly connecting the scavenge pump to the outlet of the auxiliary pump and configured to increase a first pressure produced by the auxiliary pump at the pressure sensor, wherein the first pressure is greater than a second pressure created by the scavenge pump at the pressure sensor; and
   a pressure responsive valve disposed in a common delivery pathway of both the scavenge pump and the auxiliary pump, the pressure responsive valve shunting the lubricant received from the auxiliary pump to the engine during the abnormal condition;
   wherein the pressure sensor is disposed along a fluid pathway connecting the auxiliary pump to the pressure responsive valve, between the auxiliary pump and the pressure responsive valve; and
   wherein the restriction device is disposed along the conduit between the scavenge pump and the pressure responsive valve.

9. The lubrication system of claim 8 further comprising a conduit fluidly connecting a sump to an inlet of the auxiliary pump.

10. The lubrication system of claim 8, wherein the pressure sensor sends a failed pump indication to a controller when the pressure sensor detects a pressure below a predetermined value.

11. The lubrication system of claim 8, wherein the restriction device is an orifice.

12. The lubrication system of claim 8, further comprising an auxiliary tank collecting lubricant from the engine and supplying the lubricant to the auxiliary pump.

13. A method for lubricating an engine, the method comprising:
   providing lubricant to the engine from a first pump during a normal condition;
   providing lubricant to the engine from a second pump during an abnormal condition;
   monitoring pressure produced by the second pump via a pressure sensor;
   increasing the pressure produced by the second pump by restricting lubricant flowing from the second pump via a restriction device,
   wherein the increased pressure is greater than a pressure produced by the first pump; and
   shunting the lubricant received from the second pump to the engine during the abnormal condition via a pressure responsive valve disposed in a common delivery pathway of both the first pump and the second pump;
   wherein the pressure sensor is disposed along a fluid pathway connecting the second pump to the pressure responsive valve, between the second pump and the pressure responsive valve; and
   wherein the restriction device is disposed along the conduit between the first pump and the pressure responsive valve.

14. The method of claim 13, wherein providing lubricant to the engine from during the normal condition comprises extracting lubricant from a sump by the first pump, the sump collecting lubricant from the engine.

15. The method of claim 14, further comprising extracting lubricant from the sump by the second pump.

16. The method of claim 14, wherein the providing lubricant to the engine from during the abnormal condition comprises extracting lubricant from an auxiliary tank by the second pump, the auxiliary tank collecting lubricant from the engine.

17. The method of claim 14, further comprising sending a failed pump indication to a controller when a pressure below a predetermined value is detected.

18. The method of claim 14, wherein the restricting is performed by an orifice.

* * * * *